May 6, 1958 L. L. NEWMAN 2,833,643
APPARATUS FOR AND METHOD OF REDUCING ORE
Filed April 19, 1956
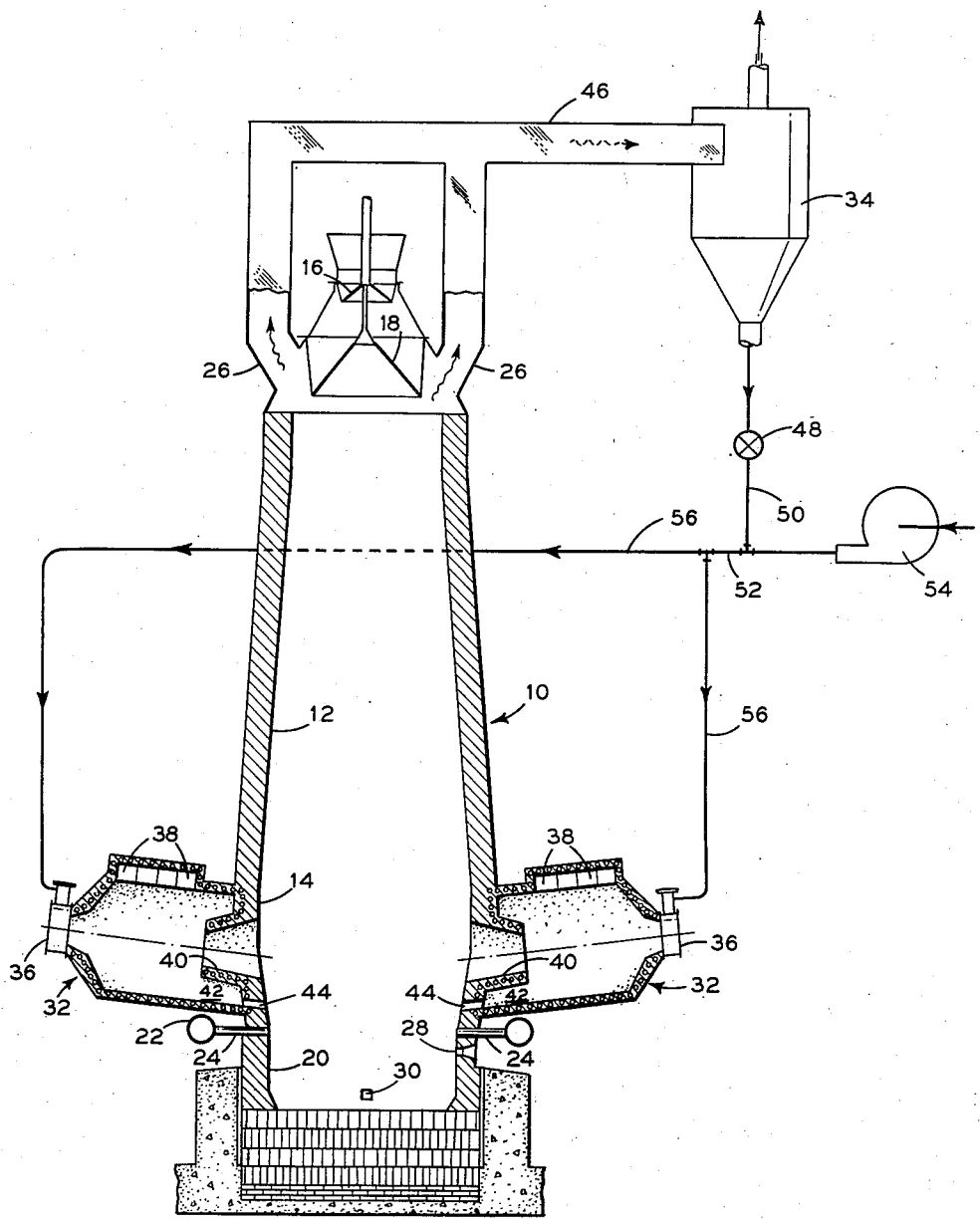
INVENTOR.
Louis L. Newman
BY
*J. P. Moran*
ATTORNEY

2,833,643

APPARATUS FOR AND METHOD OF REDUCING ORE

Louis L. Newman, Washington, D. C.

Application April 19, 1956, Serial No. 579,188

14 Claims. (Cl. 75—41)

The present invention relates in general to the construction and operation of apparatus for smelting iron ore. More particularly, the invention relates to the construction and operation of blast furnaces especially adapted for receiving a predominant portion of the heat and reducing agents required for the smelting of the iron ore in the form of products of combustion discharging from a laterally adjacent combustion chamber or chambers generally of the type disclosed in U. S. Patent No. 2,594,312. The invention also concerns the recovery of the flue dust entrained in the gases leaving the blast furnace.

Essentially, the blast furnace process includes the charging of iron ore, fuel (coke) and flux (limestone and dolomite) into the top of the furnace and blowing heated air (blast) into the bottom. Normally, the reduction of iron ore requires a good grade of metallurgical coke of a size large enough not to be blown out of the furnace. The usual coke for blast furnace consumption should be sufficiently firm and strong to resist shattering by handling and crushing by the pressure exerted by the heavy blast-furnace burden. It should be free of dust and fines, and in pieces not too large for optimum speed of combustion. With a good coking coal, these physical properties can be controlled only moderately. This coke is expensive, and requires costly coke ovens for its manufacture. As a matter of fact, metallurgical coke represents the largest single item of expense in assembling raw materials for the manufacture of iron. Therefore, any appreciable reduction in the blast furnace coke rates or requirements which can be effected, while maintaining substantially the same efficiency of operation, will have a beneficial effect upon iron and steel plant fuel economy as a whole.

Blast furnace flue dust includes fine material of the blast furnace charge which is carried in suspension in the outgoing furnace gases. This material is substantially of the same general analysis as the blast-furnace charge, except for particle size. It has been customary to sinter the flue dust produced in the operation of the blast furnace and collected in dust collectors into a product more acceptable for recharging into the furnace. As the supply of high-grade ore is depleted, the function of a sintering plant becomes more extensive. It can be readily understood that recovery and utilization of this flue dust, in conjunction with the use of low-grade ore and fluxing material in the blast-furnace charge, without the need for sintering treatment would result in more efficient and economical blast furnace operation.

The present invention provides for introducing into a combustion chamber of substantially circular cross-section arranged laterally adjacent and opening to the bosh portion of a blast furnace a combustible mixture including a slag-forming solid fuel in a quantity sufficient to provide a predominant portion of the heat and reducing agents required for the smelting of the iron ore and an oxygen-containing gas in a fuel-oxygen ratio insufficient for the complete combustion of fuel. The charge to the blast furnace includes sufficient carbonaceous solids to provide the remaining heat and reducing agents required for the smelting of the iron ore. The carbon monoxide-rich gases generated in the combustion chamber discharge into the bosh portion of the blast furnace and mix with the ascending gases generated therein. The gases so mixed, rich in carbon monoxide, then pass upwardly through the descending blast-furnace charge. With this arrangement, the consumption of the high grade metallurgical coke normally included in the charge to a blast furnace can be substantially reduced by firing a cheaper fuel in the associated circular combustion chamber, while maintaining substantially the same level of efficiency of operation. The invention also provides for the recovery and utilization in the blast furnace process of the flue dust carried in the gases discharging from the top of the blast furnace without subjecting the flue dust to the time-consuming and expensive sintering treatment heretofore required, and thereby making it advantageous to use low-grade ore and fluxing material in the blast-furnace charge.

The various features of novelty which characterize my invention are pointed out with particularity in the claims annexed to and forming a part of this specification. For a better understanding of the invention, its operating advantages and specific objects attained by its use, reference should be had to the accompanying drawing and descriptive matter in which I have illustrated and described a preferred embodiment of my invention.

In the accompanying drawing, I have shown a diagrammatic sectional elevation of iron ore reducing apparatus constructed and arranged in accordance with my invention. As shown in the drawing, a blast furnace 10 of conventional design is provided with stack and bosh portions 12 and 14; upper and lower bells 16 and 18 through which the charge is intermittently fed into the top part of the blast furnace; a hearth 20 which serves as a large basin to collect the reduced metal and slag; a bustle pipe 22 which encircles and equally distributes the heated blast air from the hot blast line, not shown, to each tuyere connection 24; off-takes 26 for the removal of the gases generated in the process; a cinder notch 28 for tapping off the liquid slag; and an iron notch 30 through which the iron is tapped. The furnace diameter increases from the top toward the bottom of the stack to permit the charge to move downward without hindrance. The bosh decreases in diameter from top to bottom and acts as a partial support for the material above it. This decrease in diameter also accommodates the decrease in volume which takes place in the charge as it is melted.

In accordance with my invention, a major portion of the heat and reducing agents required in the smelting process is supplied by products of combustion from a cyclone furnace or furnaces 32 arranged circumferentially about and adapted to discharge radially into the blast furnace. The cyclone furnaces are preferably located at a point above the tuyeres 24 where the carbon dioxide is substantially reduced to carbon monoxide. In a thousand-ton-per-day blast furnace, this position is approximately 20 feet above the bottom of the blast furnace. The temperature at this position is about 2820° F. In the present embodiment, the cyclone furnaces 32 are mounted in the circumferential wall of the blast furnace at a common elevation at a location adjacent the junction of the stack and bosh portions thereof and are arranged symmetrically about the vertical axis of the blast furnace. Each of the cyclone furnaces is of horizontally elongated substantially circular cross-section with its major axis arranged substantially horizontal, the furnace chamber being formed by closely spaced studded and fluid cooled tubes covered by a layer of suitable refractory material and proportioned under normal conditions of operation to maintain a furnace temperature above the fuel ash fusion temperature. Such tubes can be supplied with a flow of cooling fluid from the customary source of cooling fluid used about the blast furnace.

The fuel supplied to the cyclone furnaces may be crushed or coarsely pulverized anthracite, bituminous and semi-bituminous coals, lignite, other solid fuels of like character, gaseous fuels, or liquid fuels such as oil or tar. The fuel may also be a crushed or coarsely pulverized coke, preferably of a quality inferior to the coke customarily used in the blast-furnace charge so as to realize the fuel saving contemplated by the present invention. The fuel fired in the cyclone furnaces provides a major portion of the carbon and sensible heat necessary to maintain the reducing reaction in the blast furnace, thus making it possible to substantially reduce the quantity of high grade coke heretofore required in the blast furnace process.

The flue dust from the dust collectors can be admitted with the fuel to the cyclone furnaces without being subjected to the sintering operation formerly required.

Considering, among other things, the wide variance between the cost of metallurgical coke and the substitute fuels that can be fired in the cyclone furnace, as well as the recovery of the blast-furnace flue dust without need for sintering, it is estimated that 10 to 20% of the normal annual fuel cost for a blast furnace might be saved.

The air supplied to the cyclone furnaces preferably includes a high percentage of oxygen, such as industrial or tonnage oxygen. If necessary, steam may be admitted with the air supplied to the cyclone furnaces to reduce the temperature of the gases discharging therefrom. The combustion air should be so regulated that the burning of the fuel takes place in a reducing atmosphere, thus producing gases rich in reducing agents including carbon monoxide and hydrogen for the reduction of the iron ore in the blast furnace. It is contemplated that the products of combustion discharged to the blast furnace, except for such variables as nitrogen content when oxygen-enriched air is used, hydrogen content when steam is admitted with the cyclone furnace combustion air, and hydrocarbon content due to differences in fuels employed, will be of like character and at about the same temperature as the ascending gases generated in the blast furnace at the zone of cyclone furnace gas introduction.

The coarsely pulverized or granulated fuel together with the flue dust from dust collector 34, carried in a stream of preheated primary air, preferably enriched by oxygen, is introduced tangentially into a fuel inlet 36 in the outer tapered end of the cyclone furnace, so as to impart a whirling motion to the mixture as it enters the furnace chamber. By centrifugal action the coarse particles of flue dust and fuel are thrown in and become embedded in the thin layer of molten slag which is normally present in the inner surface of the furnace walls and are burned by the scrubbing action by the high velocity secondary air, also preferably enriched by oxygen, admitted tangentially through ports 38 along the furnace length in the same direction of rotation as the primary air-fuel-flue dust mixture. If required, steam may be admitted with the secondary air to reduce the temperature of the gases discharging from the cyclone furnace. The high velocity of the burning fuel-flue dust-air mixture causes the gas stream to follow a helical path toward the rear of the furnace where the gas is caused to reverse direction before entering a fluid cooled throat 40. The gas flow reversing action is effected by an annular pocket 42 and facilitates the separation of suspended slag particles from the outgoing gases. The operating pressure of the cyclone furnace should be slightly higher than the blast furnace pressure at the point of admittance of cyclone furnace gases. Molten slag, including reduced and melted iron from the flue dust, resulting from combustion continuously discharges through an opening 44 at the rear of each cyclone furnace into the bosh portion of the blast furnace and flows down to the pools of liquid metal and slag in the hearth, the melted iron from the flue dust settling to the bottom of the hearth.

The carbon monoxide rich gas discharging from the throat 40 of each cyclone furnace into the upper bosh portion of the blast furnace are at approximately the same temperature as the blast-furnace gases at the zone of introduction and at a pressure to a small extent greater than the existing pressure at the point of gas introduction.

The coke included in the charge to the blast furnace should be in such quantity as to provide the carbon and sensible heat necessary to carry out and complete the reducing and melting reactions in the bosh zone subjacent the gas outlets of the cyclone furnaces. It is estimated that 25% of the coke normally supplied in the blast furnace process will provide the heat and reducing agent requirements in the lower bosh region. The remaining 75% of the heat and reducing agents required in the smelting process are supplied by the products of combustion from the cyclone furnaces.

The ore, limestone and coke are charged into the top of the blast furnace. The stock, with its interstitial spaces filled with an ascending collection of hot gases including the reducing gases carbon monoxide and hydrogen descends to region of higher and higher temperatures until near the bosh, the iron ore is practically all reduced and the spongy iron is heated to incandescence. The gases entering the blast furnace through the throat of each cyclone furnace joins and mixes with the gas generated in the lower portion of the bosh. The ascending gases thus mixed contact the descending charge. The iron becomes pasty in the region of cyclone furnace gas introduction, absorbs carbon more rapidly and finally melts, trickling down over the incandescent coke into the hearth. Heated air, which may also be enriched by oxygen, is blown into the lower portion of the bosh through the tuyeres 24 in a quantity reduced in proportion to the decrease in the amount of coke used in the charge. The oxygen of the blast unites almost immediately with the carbon of the coke to form carbon monoxide. The high temperatures at the tuyeres produces a fluid slag and molten metal which readily flow through the solid reacting charge, separate into two layers at the bottom of the blast furnace, and are periodically run out in two separate streams as molten pig iron and as molten slag.

The gases leaving the top of the stack 12 discharge through the off-takes 26 and a conduit 46 to the dust collector 34 to remove the entrained flue dust, and then flow to stoves, not shown, where they are burned. From the dust collector 34, the flue dust is discharged through a regulable feeder 48 and a conduit 50 to a conduit 52. The flue dust discharging from the conduit 50 is picked up by a regulable stream of air supplied by a blower 54 to the conduit 52 and carried through conduits 56 to the fuel inlets 36.

While in accordance with the provisions of the statutes I have illustrated and described herein the best form of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. In the production of iron in a blast furnace having walls defining a hearth, a bosh and a stack wherein a charge including a mixture of iron ore, carbonaceous solids and fluxing agents is supplied to the top of said stack and blast air is supplied to the lower portion of the bosh, the method of operation which comprises introducing into a combustion chamber of substantially circular cross-section a combustible mixture including a slag-forming fuel in a quantity sufficient to provide a major portion of the heat and reducing agents required for the smelting of the iron ore and a free oxygen-containing gas in a fuel-oxygen ratio insufficient for the complete combustion of the fuel, partially burning the combustible mixture at a temperature above the fuel ash fusion temperature to produce gaseous products of combustion rich in carbon monoxide, causing the burning fuel and oxygen-containing gas so introduced to move axially through the combustion chamber in a helical path along the circumferential wall of sufficient length to cause the release of the ash content of the fuel and the deposition of slag on the circumferential wall to form a sticky surface thereon sufficient to cause fuel particles to adhere thereto, passing the carbon monoxide-rich gases thus generated into the lower portion of the blast furnace, supplying the remaining heat and iron ore reducing requirements of the charge by reacting the carbonaceous solids in the charge with the blast air and mixing the gases so generated with the carbon monoxide-rich gases from the combustion chamber, passing the gases so mixed upwardly through the descending blast-furnace charge, and withdrawing slag separated in the combustion chamber in a molten condition.

2. In the production of iron in a blast furnace having walls defining a hearth, a bosh and a stack wherein a charge including a mixture of iron ore, carbonaceous solids and fluxing agents is supplied to the top of said stack and blast air is supplied to the lower portion of the bosh, the method of operation which comprises introducing into a cyclone furnace of substantially circular cross-section a combustible mixture including a slag-forming fuel in a quantity sufficient to provide a major portion of the heat and reducing agents required for the smelting of the iron ore and oxygen-enriched air in a fuel-air ratio insufficient for the complete combustion of the fuel, partially burning the combustible mixture at a temperature above the fuel ash fushion temperature to produce gaseous products of combustion rich in carbon monoxide, causing the burning fuel and air so introduced to move axially through the cyclone furnace in a helical path along the circumferential wall of sufficient length to cause the release of the ash content of the fuel and the deposition of slag on the circumferential wall to form a sticky surface thereon sufficient to cause fuel particles to adhere thereto, passing the carbon monoxide-rich gases thus generated into the bosh, supplying the remaining heat and iron ore reducing requirements of the charge by reacting the carbonaceous solids in the charge with the blast air and mixing the gases so generated with the carbon-monoxide-rich gases from the cyclone furnace, passing the gases so mixed upwardly through the descending blast-furnace charge, and withdrawing slag separated in the cyclone furnace in a molten condition.

3. In the production of iron in a blast furnace having walls defining a hearth, a bosh and a stack wherein a charge including a mixture of iron ore, carbonaceous solids and fluxing agents is supplied to the top of said stack and blast air is supplied to the lower portion of the bosh, the method of operation which comprises introducing into a combustion chamber of substantially circular cross-section a combustible mixture including a slag-forming fuel in a quantity sufficient to provide a major portion of the heat and reducing agents required for the smelting of the iron ore and a free oxygen-containing gas in a fuel-oxygen ratio insufficient for the complete combustion of the fuel, partially burning the combustible mixture at a temperature above the fuel ash fusion temperature to produce gaseous products of combustion rich in carbon monoxide, causing the burning fuel and oxygen-containing gas so introduced to move axially through the combustion chamber in a helical path along the circumferential wall of sufficient length to cause the release of the ash content of the fuel and the deposition of slag on the circumferential wall to form a sticky surface thereon sufficient to cause fuel particles to adhere thereto, passing the carbon monoxide-rich gases thus generated into the lower portion of the blast furnace at a temperature substantially the same as the ascending gases generated in the blast furnace at the zone into which the combustion chamber gases are introduced, supplying the remaining heat and iron ore reducing requirements of the charge by reacting the carbonaceous solids in the charge with the blast air and mixing the gases so generated with the carbon monoxide-rich gases from the combustion chamber, passing the gases so mixed upwardly through the descending blast-furnace charge, and withdrawing slag separated in the combustion chamber in a molten condition.

4. In the production of iron in a blast furnace having walls defining a hearth, a bosh and a stack wherein a charge including a mixture of iron ore, carbonaceous solids and fluxing agents is supplied to the top of said stack and blast air is supplied to the lower portion of the bosh, the method of operation which comprises introducing into a combustion chamber of substantially circular cross-section having a gas outlet at one end a combustible mixture including a slag-forming fuel in a quantity sufficient to provide a major portion of the heat and reducing agents required for the smelting of the iron ore and a free oxygen-containing gas in a fuel-oxygen ratio insufficient for the complete combustion of the fuel, partially burning the combustible mixture at a temperature above the fuel ash fusion temperature to produce gaseous products of combustion rich in carbon monoxide, causing the burning fuel and oxygen-containing gas so introduced to move axially through the combustion chamber to the gas outlet in a helical path along the circumferential wall of sufficient length to cause the release of the ash content of the fuel and the deposition of slag on the circumferential wall to form a sticky surface thereon sufficient to cause fuel particles to adhere thereto, passing the carbon monoxide-rich gases thus generated through the gas outlet into the upper portion of the bosh at a temperature substantially the same as the ascending gases generated in a blast furnace at the zone into which the combustion chamber gases are introduced, supplying the remaining heat and iron ore reducing requirements of the charge by reacting the carbonaceous solids in the charge with the blast air and mixing the gases so generated with the carbon monoxide-rich gases from the combustion chamber, passing the gases so mixed upwardly through the descending blast-furnace charge, and withdrawing slag separated in the combustion chamber in a molten condition and passing it to said hearth.

5. In the production of iron in a blast furnace having walls defining a hearth, a bosh and a stack wherein a charge including a mixture of iron ore, carbonaceous solids and fluxing agents is supplied to the top of said stack, blast air is supplied to the lower portion of the bosh and gases laden with flue dust are withdrawn from the top of the stack, the method of operation which comprises introducing into a combustion chamber a combustible mixture including a slag-forming fuel in a quantity sufficient to provide a major portion of the heat and reducing agents required for the smelting of the iron ore and a free oxygen-containing gas in a fuel-oxygen ratio insufficient for the complete combustion of the fuel, separating and removing substantially all of the flue dust from the gases discharged from the stack, conveying and injecting the collected flue dust into the combustion chamber, partially burning the combustible mixture at a temperature above the fuel ash fusion temperature to produce gaseous products of combustion rich in carbon monoxide, causing the burning fuel, oxygen-containing gas and flue dust so introduced to move axially through the combustion chamber in a whirling path along the peripheral wall of sufficient length to cause the release of the ash content of the fuel, substantially complete smelting of the iron ore in the flue dust, and the deposition of slag on the peripheral wall to form a sticky surface thereon sufficient to cause fuel particles and flue dust to adhere thereto, passing the carbon monoxide-rich gases thus generated into the lower portion of the blast furnace, supplying the remaining heat and iron ore reducing requirements of the charge by reacting the carbonaceous solids in the charge with the blast air and mixing the gases so generated with the carbon monoxide-rich gases from the combustion chamber, passing the gases so mixed upwardly through the descending blast-furnace charge, and withdrawing slag including the substantially smelted iron ore separated in the combustion chamber in a molten condition.

6. In the production of iron in a blast furnace having walls defining a hearth, a bosh and a stack wherein a charge including a mixture of iron ore, carbonaceous solids and fluxing agents is supplied to the top of said stack, blast air is supplied to the lower portion of the bosh and gases laden with flue dust are withdrawn from the top of the stack, the method of operation which comprises introducing into a combustion chamber of substantially circular cross-section a combustible mixture including a slag-forming fuel in a quantity sufficient to provide a major portion of the heat and reducing agents required for the smelting of the iron ore and an oxygen-enriched air in a fuel-air ratio insufficient for the complete combustion of the fuel, separating and removing substantially all the flue dust from the gases discharged from the stack, conveying and injecting the collected flue dust into the combustion chamber, partially burning the combustible mixture at a temperature above the fuel ash fusion temperature to produce gaseous products of combustion rich in carbon monoxide, causing the burning fuel, air and flue dust so introduced to move axially through the combustion chamber in a helical path along the circumferential wall of sufficient length to cause the release of the ash content of the fuel, substantially complete smelting of the iron ore in the flue dust, and the deposition of slag on the circumferential wall to form a sticky surface thereon sufficient to cause fuel particles and flue dust to adhere thereto, passing the carbon monoxide-rich gases thus generated into the bosh, supplying the remaining heat and iron ore reducing requirements of the charge by reacting the carbonaceous solids in the charge with the blast air and mixing the gases so generated with the carbon monoxide-rich gases from the combustion chamber, passing the gases so mixed upwardly through the descending blast-furnace, and withdrawing slag including the substantially smelted iron ore separated in the combustion chamber in a molten condition.

7. In the production of iron in a blast furnace having walls defining a hearth, a bosh and a stack wherein a charge including a mixture of iron ore, carbonaceous solids and fluxing agents is supplied to the top of said stack, blast air is supplied to the lower portion of the bosh and gases laden with flue dust are withdrawn from the top of the stack, the method of operation which comprises introducing into a cyclone furnace of substantially circular cross-section a combustible mixture including a slag-forming fuel in a quantity sufficient to provide a major portion of the heat and reducing agents required for the smelting of the iron ore and a free oxygen-containing gas in a fuel-oxygen ratio insufficient for the complete combustion of the fuel, separating and removing substantially all of the flue dust from the gases discharged from the stack, conveying and injecting the collected flue dust into the cyclone furnace, partially burning the combustible mixture at a temperature above the fuel ash fusion temperature to produce gaseous products of combustion rich in carbon monoxide, causing the burning fuel, oxygen-containing gas and flue dust so introduced to move axially through the cyclone furnace in a helical path along the circumferential wall of sufficient length to cause the release of the ash content of the fuel, substantially complete smelting of the iron ore in the flue dust, and the deposition of slag on the circumferential wall to form a sticky surface thereon sufficient to cause fuel particles and flue dust to adhere thereto, passing the carbon monoxide-rich gases thus generated into the upper portion of the bosh, supplying the remaining heat and iron ore reducing requirements of the charge by reacting the carbonaceous solids in the charge with the blast air and mixing the gases so generated with the carbon monoxide-rich gases from the cyclone furnace, passing the gases so mixed upwardly through the descending blast-furnace charge, and withdrawing slag including the substantially smelted iron ore separated in the cyclone furnace in a molten condition.

8. In the production of iron in a blast furnace having walls defining a hearth, a bosh and a stack wherein a charge including a mixture of iron ore, carbonaceous solids and fluxing agents is supplied to the top of said stack, blast air is supplied to the lower portion of the bosh and gases laden with flue dust are withdrawn from the top of the stack, the method of operation which comprises introducing into a horizontally arranged combustion chamber of substantially circular cross-section having a gas outlet at one end a combustible mixture including a slag-forming fuel in a quantity sufficient to provide a major portion of the heat and reducing agents required for the smelting of the iron ore and a free oxygen-containing gas in a fuel-oxygen ratio insufficient for the complete combustion of the fuel, introducing steam into the combustion chamber in a quantity sufficient to provide a gas temperature at the gas outlet of the combustion chamber substantially the same as the temperature of the ascending gases generated in the blast furnace at the zone into which the combustion chamber gases are introduced, separating and removing substantially all of the flue dust from the gases discharged from the stack, conveying and injecting the collected flue dust into the combustion chamber, partially burning the combustible mixture at a temperature above the fuel ash fusion temperature to produce gaseous products of combustion rich in carbon monoxide, causing the burning fuel, oxygen-containing gas and flue dust so introduced to move axially through the combustion chamber to the gas outlet in a helical path along the circumferential wall of sufficient length to cause the release of the ash content of the fuel, substantially complete smelting of the iron ore in the flue dust, and the deposition of slag on the circumferential wall to form a sticky surface thereon sufficient to cause fuel particles and flue dust to adhere thereto, passing the carbon monoxide-rich gases thus generated through the gas outlet into the upper portion of the bosh, supplying the remaining heat and iron ore reducing requirements of the charge by reacting the carbonaceous solids in the charge with the blast air and mixing the gases so generated with the carbon monoxide-rich gases from the combustion chamber, passing the gases so mixed upwardly through the descending blast-furnace charge, and withdrawing slag including the substantially smelted iron ore separated in the combustion chamber in a molten condition and passing it to said hearth.

9. Apparatus for smelting iron ore comprising a blast furnace including upwardly extending walls defining a hearth, bosh and stack, a cyclone furnace having a combustion chamber of substantially circular cross section defined by walls including fluid cooled tubes, means forming a restricted gas outlet at one end of said combustion chamber opening to the lower portion of said blast furnace, means for introducing into said combustion chamber and effecting a helical path of travel therein along the circumferential wall of said chamber a combustible mixture including a slag-forming solid fuel in a quantity sufficient to provide a major portion of the heat and reducing agents required for the smelting of the iron ore and an oxygen-containing gas in a fuel-oxygen ratio insufficient for the complete combustion of the fuel, a slag outlet in the lower part of said combustion chamber, means for supplying to the top of said stack a charge including a mixture of iron ore, fluxing agents and carbonaceous solids in a quantity sufficient to provide the remaining heat and iron ore reducing requirements of the charge, and means for introducing blast air to the lower portion of said bosh.

10. Apparatus for smelting iron ore comprising a blast furnace including upwardly extending walls defining a hearth, bosh and stack, walls including fluid cooled tubes defining a combustion chamber of substantially circular cross-section, means forming a restricted gas outlet at one end of said combustion chamber opening to said bosh, means for introducing into said combustion chamber and effecting a helical path of travel therein along the circumferential wall of said chamber a combustible mixture including a slag-forming solid fuel in a quantity sufficient to provide a major portion of the heat and reducing agents required for the smelting of the iron ore and an oxygen-containing gas in a fuel-oxygen ratio insufficient for the complete combustion of the fuel, a slag outlet in the lower part of said combustion chamber, means for supplying to the top of said stack a charge including a mixture of iron ore, fluxing agents and carbonaceous solids in a quantity sufficient to provide the remaining heat and iron ore reducing requirements of the charge, and means for introducing blast air to the lower portion of said bosh.

11. Apparatus for smelting iron ore comprising a blast furnace including upwardly extending walls defining a hearth, bosh and stack, a cyclone furnace having a combustion chamber of substantially circular cross-section arranged with its axis substantially horizontal and defined by walls including fluid cooled tubes, means forming a restricted gas outlet at one end of said combustion chamber opening to the upper portion of said bosh, means for introducing into said combustion chamber and effecting a helical path of travel therein along the circumferential wall of said chamber a combustible mixture including a slag-forming solid fuel in a quantity sufficient to provide a major portion of the heat and reducing agents required for the smelting of the iron ore and an oxygen-containing gas in a fuel-oxygen ratio insufficient for the complete combustion of the fuel, a slag outlet in the lower part of said combustion chamber opening to the lower portion of said bosh, means for supplying to the top of said stack a charge including a mixture of iron ore, fluxing agents and carbonaceous solids in a quantity sufficient to provide the remaining heat and iron ore reducing requirements of the charge, and means for introducing blast air to the lower portion of said bosh.

12. Apparatus for smelting iron ore comprising a blast furnace including upwardly extending walls defining a hearth, bosh and stack, walls including fluid cooled tubes defining a combustion chamber, means forming a restricted gas outlet at one end of said combustion chamber opening to the lower portion of said blast furnace, means for introducing into said combustion chamber and effecting a helical path of travel therein along the peripheral wall of said chamber flue dust separated from the gases discharged from said stack and a combustible mixture including a slag-forming solid fuel in a quantity sufficent to provide a major portion of the heat and reducing agents required for the smelting of the iron ore and an oxygen-containing gas in a fuel-oxygen ratio insufficient for the complete combustion of the fuel, a slag outlet in the lower part of said combustion chamber, means for supplying to the top of said stack a charge including a mixture of iron ore, fluxing agents and carbonaceous solids in a quantity sufficient to provide the remaining heat and iron ore reducing requirements of the charge, and means for introducing blast air to the lower portion of said bosh.

13. Apparatus for smelting iron ore comprising a blast furnace including upwardly extending walls defining a hearth, bosh and stack, a cyclone furnace having a combustion chamber of substantially circular cross-section arranged with its axis substantially horizontal and defined by walls including fluid cooled tubes, means forming a restricted gas outlet at one end of said combustion chamber opening to the upper portion of said bosh, means for introducing into said combustion chamber and effecting a helical path of travel therein along the wall of said chamber flue dust separated from the gases discharged from said stack and a combustible mixture including a slag-forming solid fuel in a quantity sufficient to provide a major portion of the heat and reducing agents required for the smelting of the iron ore and an oxygen-containing gas in a fuel-oxygen ratio insufficient for the complete combustion of the fuel, a slag outlet in the lower part of said combustion chamber opening to the lower portion of said bosh, means for supplying to the top of said stack a charge including a mixture of iron ore, fluxing agents and carbonaceous solids in a quantity sufficent to provide the remaining heat and iron ore reducing requirements of the charge, and means for introducing blast air to the lower portion of said bosh.

14. Apparatus for smelting iron ore comprising a blast furnace including upwardly extending walls defining a hearth, bosh and stack, a plurality of circumferentially spaced cyclone furnaces arranged at substantially the same elevation in the wall defining said bosh, each cyclone furnace having a combustion chamber of substantially circular cross-section arranged with its axis substantially horizontal and defined by walls including fluid cooled tubes, means forming a restricted gas outlet at one end of each combustion chamber opening to the upper portion of said bosh, means for introducing into each combustion chamber and effecting a horizontal path of travel therein along the circumferential wall of each combustion chamber flue dust separated from the gases discharged from said stack and a combustible mixture including a slag-forming solid fuel in a quantity sufficient to provide a major portion of the heat and reducing agents required for the smelting of the iron ore and an oxygen-containing gas in a fuel-oxygen ratio insufficient for the complete combustion of the fuel, a slag outlet in the lower part of each combustion chamber opening to the lower portion of said bosh, means for supplying to the top of said stack a charge including a mixture of iron ore, fluxing agents and carbonaceous solids in a quantity sufficient to provide the remaining heat and iron ore reducing requirements of the charge, and means for introducing blast air to the lower portion of said bosh.

References Cited in the file of this patent

UNITED STATES PATENTS

| 914,830 | Harper | Mar. 9, 1909 |
| 2,195,866 | Clarick | Apr. 2, 1940 |
| 2,357,301 | Bailey et al. | Sept. 5, 1944 |
| 2,594,312 | Kerr et al. | Apr. 29, 1952 |

FOREIGN PATENTS

| 689,291 | Great Britain | Mar. 25, 1953 |
| 161,146 | Australia | Feb. 15, 1955 |

OTHER REFERENCES

Babcock and Wilcox Co.: The Cyclone Furnace, Bulletin G–65, 1954 (page 11 relied on), 161 E. 42nd St., New York, N. Y.

Sweetser: Blast Furnace Practice, first edition, McGraw-Hill Book Co., Inc., New York (1938) (pages 295–296 relied on).